United States Patent
Tatsumi

(10) Patent No.: US 9,306,874 B2
(45) Date of Patent: Apr. 5, 2016

(54) NETWORK RELAY SYSTEM AND SWITCHING DEVICE

(71) Applicant: Hitachi Metals, Ltd., Minato-ku, Tokyo (JP)

(72) Inventor: Tomoyoshi Tatsumi, Tsuchiura (JP)

(73) Assignee: Hitachi Metals, Ltd., Tokyo (JP)

(*) Notice: Subject to any disclaimer, the term of this patent is extended or adjusted under 35 U.S.C. 154(b) by 96 days.

(21) Appl. No.: 14/334,376

(22) Filed: Jul. 17, 2014

(65) Prior Publication Data

US 2015/0103829 A1 Apr. 16, 2015

(30) Foreign Application Priority Data

Oct. 15, 2013 (JP) ................................. 2013-215021

(51) Int. Cl.
*H04L 12/935* (2013.01)
*H04L 12/709* (2013.01)

(52) U.S. Cl.
CPC .......... *H04L 49/3009* (2013.01); *H04L 45/245* (2013.01)

(58) Field of Classification Search
None
See application file for complete search history.

(56) References Cited

U.S. PATENT DOCUMENTS

| 2010/0316053 A1 | 12/2010 | Miyoshi et al. |
| 2011/0149986 A1* | 6/2011 | Sugawara ......... H04L 12/40013 370/401 |
| 2012/0128005 A1 | 5/2012 | Tatsumi et al. |

FOREIGN PATENT DOCUMENTS

| JP | 2010-288168 A | 12/2010 |
| JP | 2013-70297 A | 4/2013 |

* cited by examiner

*Primary Examiner* — Hoon J Chung
(74) *Attorney, Agent, or Firm* — Crowell & Moring LLP

(57) ABSTRACT

A port switch of type A has a distribution mode for maintaining a backward compatibility with a port switch of type B. A distribution identifier calculating unit performs a logical operation with the same operational expression to the same bit region as the type B in a header contained in a frame, thereby calculating a k-bit (k>j) distribution identifier partly containing the same j-bit bit region as the type B. A distribution table indicates a correspondence relation between three sub-links and the k-bit distribution identifier, and has contents in which the j-bit distribution identifier in the distribution table of the type B is replaced with the k-bit distribution identifier partly containing the same j-bit value as that of the j-bit distribution identifier.

9 Claims, 14 Drawing Sheets

FIG. 6A

15
DISTRIBUTION TABLE (TYPE B)

| DISTRIBUTION ID (DID) | | | SUB-LINK ID |
|---|---|---|---|
| b[i+2] | b[i+1] | b[i] | |
| 0 | 0 | 0 | {SL[0]} |
| 0 | 0 | 1 | |
| ⋮ | ⋮ | ⋮ | ⋮ |
| 1 | 1 | 1 | {SL[3]} |

FIG. 6B

25b
DISTRIBUTION TABLE
(BACKWARD-COMPATIBLE DISTRIBUTION MODE)

| DISTRIBUTION ID (DID) | | | | | SUB-LINK ID |
|---|---|---|---|---|---|
| b[i+4] | b[i+3] | b[i+2] | b[i+1] | b[i] | |
| 0 | 0 | 0 | 0 | 0 | {SL[0]} |
| 0 | 1 | | | | |
| 1 | 0 | | | | |
| 1 | 1 | | | | |
| 0 | 0 | 0 | 0 | 1 | |
| 0 | 1 | | | | |
| 1 | 0 | | | | |
| 1 | 1 | | | | |
| ⋮ | ⋮ | ⋮ | ⋮ | ⋮ | ⋮ |
| 0 | 0 | 1 | 1 | 1 | {SL[3]} |
| 0 | 1 | | | | |
| 1 | 0 | | | | |
| 1 | 1 | | | | |

FIG. 8

25b DISTRIBUTION TABLE
(BACKWARD-COMPATIBLE DISTRIBUTION MODE)

| SUB-LINK ID | PORT ID | DISTRIBUTION IDENTIFIER (DID) |
|---|---|---|
| {SL[1]} | {Pf[1,1]} | DID0,24,17,10 |
| | {Pf[1,2]} | DID8,1,25,18 |
| | {Pf[1,3]} | DID16,9,2,26 |
| {SL[2]} | {Pf[2,1]} | DID3,27,20,13 |
| | {Pf[2,2]} | DID11,4,28,21 |
| | {Pf[2,3]} | DID19,12,5,29 |
| {SL[3]} | {Pf[3,1]} | DID6,22,7,23 |
| | {Pf[3,2]} | DID14,30,15,31 |

FIG. 10A

54 ADDRESS TABLE

| PORT ID/MAIN LINK ID | MAC ADDRESS |
|---|---|
| {Pu(1)} | MAxx |
| ... | ... |
| {Pu(p)} | MAyy |
| {ML(1)} | MAzz,... |

FIG. 10B

53 LAG TABLE

| MAIN LINK ID | SUB-LINK ID | PORT ID | STATE |
|---|---|---|---|
| {ML(1)} | {SL(1)} | {Pf(1)} | NORMAL |
| | | {Pf(2)} | NORMAL |
| | ... | ... | ... |
| | {SL(m)} | {Pf(q-1)} | NORMAL |
| | | {Pf(q)} | NORMAL |

NETWORK RELAY SYSTEM AND SWITCHING DEVICE

CROSS-REFERENCE TO RELATED APPLICATION

The present application claims priority from Japanese Patent Application No. 2013-215021 filed on Oct. 15, 2013, the content of which is hereby incorporated by reference into this application.

TECHNICAL FIELD OF THE INVENTION

The present invention relates to a network relay system and a switching device, for example, a network relay system in which a link aggregation group is set to a communication from one switching device to a plurality of switching devices.

BACKGROUND OF THE INVENTION

For example, Japanese Patent Application Laid-Open Publication No. 2013-70297 (Patent Document 1) discloses a method of automatically setting LAG to a plurality of links which connect each interface relay and a plurality of fabric relays in a network relay system including the plurality of fabric relays and the plurality of interface relays. Japanese Patent Application Laid-Open Publication No. 2010-288168 (Patent Document 2) discloses a method in which each leaf switch transfers a packet received from a terminal to a specific route switch based on a destination address thereof and also transfers a learning packet to a specific route switch based on a source address thereof in a configuration including a plurality of leaf switches and a plurality of route switches relaying the communication therebetween.

SUMMARY OF THE INVENTION

For example, as disclosed in the Patent Document 1 and others, a technique of establishing a network relay system by combining a plurality of box-type switching devices instead of a chassis-type switching device has been known. In this network relay system, a plurality of box-type switching devices (here, referred to as port switch) and a plurality of box-type switching devices (here, referred to as fabric switch) which function to relay a frame between the port switches are provided. Each port switch has a link to each of the plurality of fabric switches, and sets a link aggregation group (hereinafter, abbreviated as LAG) to the plurality of links. In this specification, the network relay system like this is referred to as a box-type fabric system.

In such a box-type fabric system, when each port switch receives a frame transmitted from a terminal or the like and relays the frame to a terminal or the like connected to another port switch, the port switch relays the received frame so as to be properly distributed in a plurality of links to which LAG is set. The distribution in the LAG is performed based on a predetermined distribution rule. As the distribution rule at this time, the rule under which the bidirectional communication between two terminals is performed through the same fabric switch in order to suppress the degradation in communication band due to unnecessary flooding is desirable.

Here, when the box-type fabric system is established with port switches having the same specifications, since the fabric switches through which communication is performed are determined by the same distribution rule, the requirement like this can be relatively easily satisfied. However, when the box-type fabric system is established in a manner that port switches having different specifications are present in combination, the requirement like this may not be satisfied in some cases. Specifically, for example, there is a case in which it is desired to extend a system by adding a latest port switch to an existing system established with port switches capable of up to eight distributions. In such a case, the latest switch is probably adapted to have a larger maximum number of distributions (for example, 32 distributions). When the maximum number of distributions differs, the distribution rule differs, or the case in which the acquired result differs even under the same distribution rule may occur.

The present invention has been made in view of the problem mentioned above, and one object of the present invention is to improve the communication band in the network relay system established with switching devices having different specifications.

The above and other objects and novel characteristics of the present invention will be apparent from the description of the present specification and the accompanying drawings.

The following is a brief description of an outline of the typical embodiment of the invention disclosed in the present application.

A network relay system of this embodiment includes n (n is an integer of 2 or more) port switches including first and second switching devices, m (m is an integer of 2 or more) fabric switches functioning to relay frames between the n port switches, and a plurality of sub-links which connect the n port switches and the m fabric switches, respectively. Each of the n port switches sets a link aggregation group to m sub-links which connect itself and the m fabric switches.

In this configuration, the first switching device includes a first distribution identifier calculating unit, a first distribution table and a first relay executing unit. When the first distribution identifier calculating unit receives a frame or packet, it performs a logical operation with a predetermined operational expression while inputting a predetermined bit region in a header contained in the frame or packet, thereby calculating a j-bit distribution identifier. The first distribution table indicates a correspondence relation between the m sub-links connected to itself and the j-bit distribution identifier. The first relay executing unit relays the received frame or packet to the sub-link corresponding to the j-bit distribution identifier calculated in the first distribution identifier calculating unit based on the first distribution table.

Also, the second switching device includes a second distribution identifier calculating unit, a second distribution table and a second relay executing unit. When the second distribution identifier calculating unit receives a frame or packet, it performs a logical operation with the same operational expression as that of the first switching device while inputting the same bit region as that of the first switching device in a header contained in the frame or packet, thereby calculating a k-bit (k>j) distribution identifier partly containing the same j-bit bit region as that of the first switching device. The second distribution table indicates a correspondence relation between the m sub-links connected to itself and the k-bit distribution identifier. The second relay executing unit relays the received frame or packet to the sub-link corresponding to the k-bit distribution identifier calculated in the second distribution identifier calculating unit based on the second distribution table.

Here, the second distribution table has contents in which the j-bit distribution identifier in the first distribution table is replaced with the k-bit distribution identifier partly containing the same j-bit value as that of the j-bit distribution identifier.

The effects obtained by typical embodiments of the invention disclosed in the present application will be briefly described below. That is, it is possible to improve the communication band in the network relay system established with switching devices having different specifications.

BRIEF DESCRIPTIONS OF THE DRAWINGS

FIG. 6A is a conceptual diagram showing a configuration example of a distribution table in the port switch (type B) of FIG. 2;

FIG. 6B is a conceptual diagram showing a configuration example in the case where the distribution table in the port switch (type A) of FIG. 3 is generated in a backward-compatible distribution mode;

FIG. 8 is a diagram showing a detailed configuration example of a distribution table in the port switch (type A) of FIG. 7;

FIG. 10A is a schematic diagram showing a configuration example of the address table in FIG. 9;

FIG. 10B is a schematic diagram showing a configuration example of the LAG table in FIG. 9;

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

First Embodiment

<<Configuration of Network Relay System and Operation to be Premise Thereof>>

Figure 1:
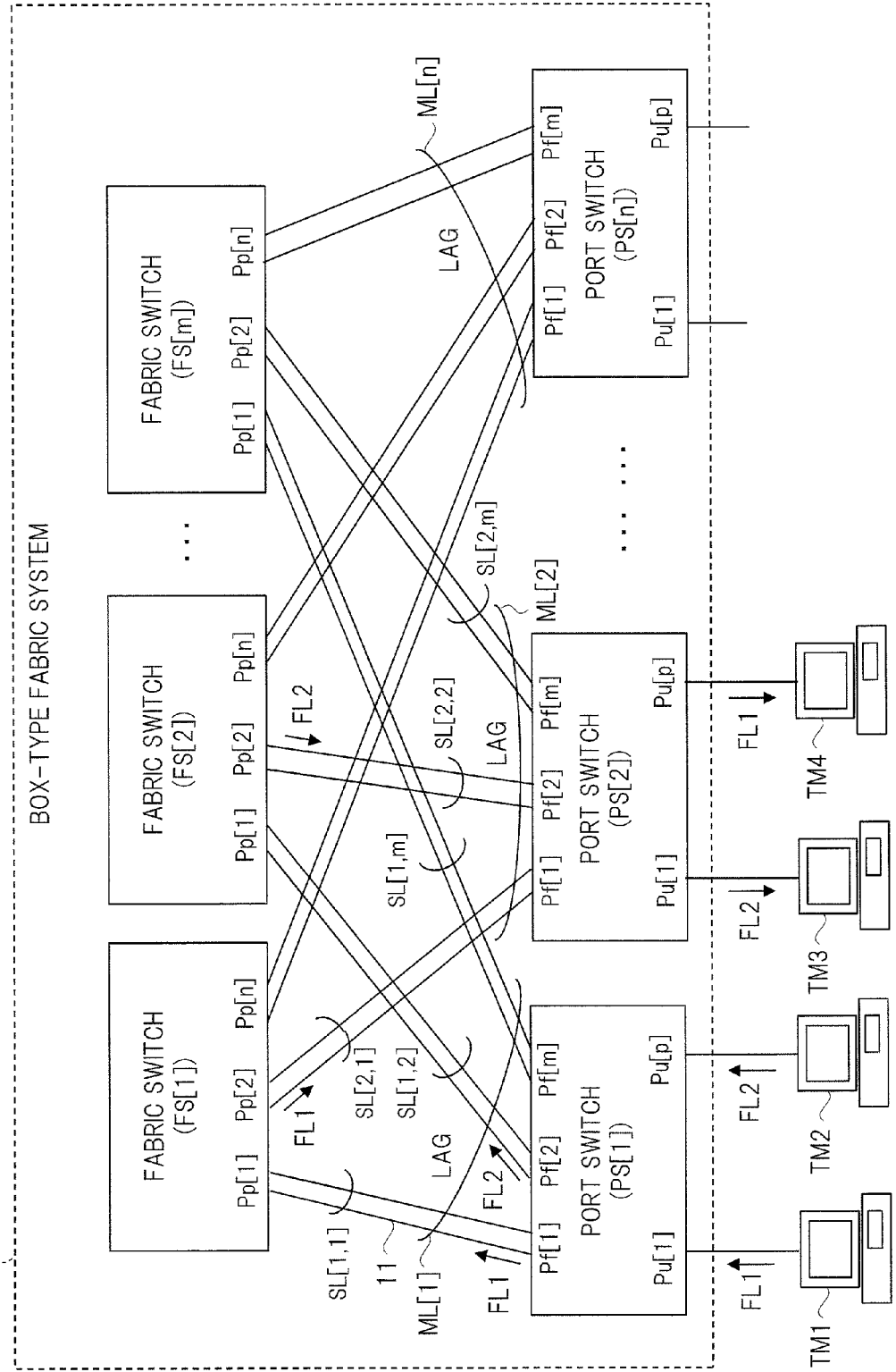
FIG. 1 is a block diagram showing a configuration example of a network relay system according to the first embodiment of the present invention and an operation example to be a premise thereof.

FIG. 1 is a block diagram showing a configuration example of a network relay system according to the first embodiment of the present invention and an operation example to be a premise thereof. The network relay system shown in FIG. 1 is composed of a box-type fabric system 10. The box-type fabric system 10 includes n (n is an integer of 2 or more) port switches PS[1] to PS[n], m (m is an integer of 2 or more) fabric switches FS[1] to FS[m], and a plurality of sub-links (for example, SL[1,1] or the like) which connect the n port switches and the m fabric switches. The m fabric switches FS[1] to FS[m] function to relay the frame between the n port switches PS[1] to PS[n].

The n port switches PS[1] to PS[n] and the m fabric switches FS[1] to FS[m] are each made up of a box-type switching device. Each of the n port switches PS[1] to PS[n] includes m fabric-switch ports Pf[1] to Pf[m] and p (p is an integer of 1 or more) user ports Pu[1] to Pu[p]. Each of the m fabric switches FS[1] to FS[m] includes n port-switch ports Pp[1] to Pp[n].

Each of the n port switches PS[1] to PS[n] sets LAG to m sub-links connecting itself and the m fabric switches FS[1] to FS[m]. For example, the port switch PS[1] sets LAG to the m sub-links SL[1,1], SL[1,2], . . . and SL[1, m] between the port switch PS[1] itself and the m fabric switches FS[1] to FS[m]. Here, the LAG set to the m sub-links is referred to as a main link ML[1]. Similarly, the port switch PS[2] sets LAG (that is, main link ML[2]) to the m sub-links SL[2,1], SL[2,2], . . . and SL[2,m] between the port switch PS[2] itself and the m fabric switches FS[1] to FS[m]. Similarly, the port switch PS[n] sets LAG (that is, main link ML[n]) to the m sub-links (though not shown, SL[n, 1], SL[n,2], . . . and SL[n,m]).

Hereinafter, the port switches PS[1] to PS[n] are collectively referred to as a port switch PS, and the fabric switches FS[1] to FS[m] are collectively referred to as a fabric switch FS. Also, the fabric-switch ports Pf[1] to Pf[m] are collectively referred to as a fabric-switch port Pf, the user ports Pu[1] to Pu[p] are collectively referred to as a user port Pu, and the port-switch ports Pp[1] to Pp[n] are collectively referred to as a port-switch port Pp. Furthermore, the sub-links SL[1,1] to SL[n,m] are collectively referred to as a sub-link SL, and the main links ML[1] to ML[n] are collectively referred to as a main link ML.

Also, in the example of FIG. 1, each sub-link SL is composed of two links 11. The link 11 means an assembly including a communication line and ports at its both ends (that is, the fabric-switch port Pf and the port-switch port Pp). Each port switch (for example, PS[1]) sets LAG to two links 11 constituting each sub-link (for example, SL[1,1]). More specifically, this LAG is the LAG in sub-link unlike the above-mentioned LAG between sub-links (that is, main link ML).

Similarly, each fabric switch (for example, FS[1]) also sets LAG to two links 11 constituting each sub-link (for example, SL[1,1]). Note that each sub-link SL is not always required to be composed of two links 11, and each sub-link SL may be composed of one link 11 or three or more links 11. The LAG in sub-link is set to the sub-link SL composed of two or more links 11.

Here, for example, the case where a frame FL1 is transferred from the terminal TM1 connected to the user port Pu[1] of the port switch PS[1] to the terminal TM4 connected to the user port Pu[p] of the port switch PS[2] is assumed. In this case, when the port switch PS[1] receives the frame FL1, it determines the fabric-switch port Pf (in other words, sub-link SL) serving as a relay destination thereof based on a predetermined distribution rule. In this case, the fabric-switch port Pf[1] is determined. As a result, the frame FL1 is transferred to the port switch PS[2] and the terminal TM4 through the route via the fabric switch FS[1].

Also, the case where a frame FL2 is transferred from the terminal TM2 connected to the user port Pu[p] of the port switch PS[1] to the terminal TM3 connected to the user port Pu[1] of the port switch PS[2] is assumed. In this case, when the port switch PS[1] receives the frame FL2, it determines the fabric-switch port Pf (in other words, sub-link SL) serving as a relay destination thereof based on a predetermined distribution rule. In this case, the fabric-switch port Pf[2] is determined. As a result, the frame FL2 is transferred to the port switch PS[2] and the terminal TM3 through the route via the fabric switch FS[2]. If the fabric-switch port Pf[2] has a fault, a fabric-switch port Pf other than that is determined.

As described above, when the box-type fabric system 10 is used, the load distribution and redundancy in the LAG can be achieved in accordance with the LAG. For example, when it is desired to expand the communication band, it can be achieved by adding the fabric switch FS, and the expansion of the communication band can be easily achieved at low cost. Also, the number of ports (that is, user ports Pu) can be easily increased at low cost by adding the port switch PS. As a result, in the case of using this system, the flexible system in compliance with the demands from a user can be established at low cost compared with the case of using a system made up of a chassis-type switching device.

<<Outline of Port Switch (Type B)>>

Figure 2:
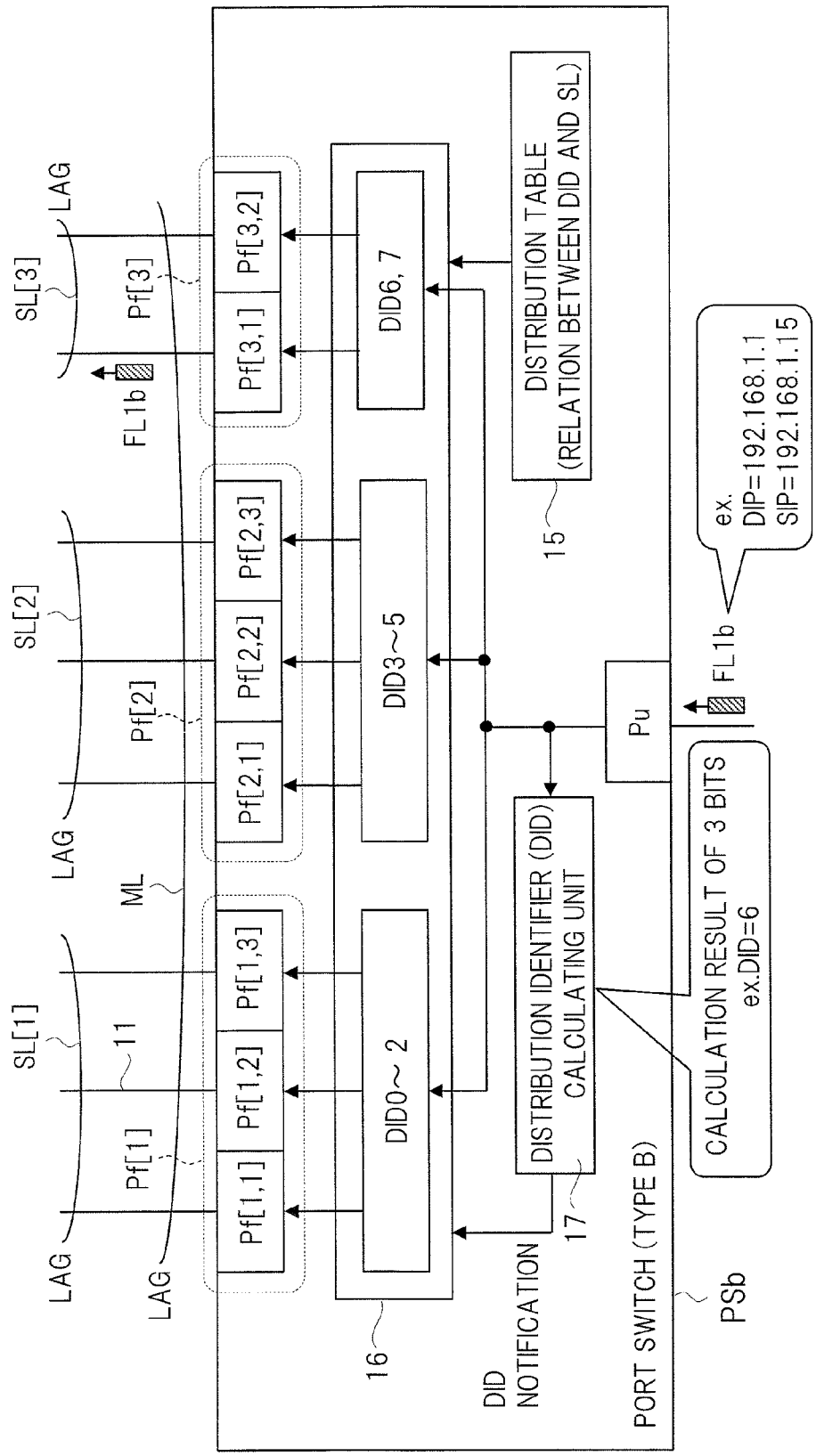
FIG. 2 is a block diagram showing a schematic configuration example of a main part of a port switch and an operation example thereof in the network relay system of FIG. 1.

FIG. 2 is a block diagram showing a schematic configuration example of a main part of a port switch and an operation example thereof in the network relay system of FIG. 1. A port switch (first switching device) PSb of a type B shown in FIG. 2 includes, for example, three fabric-switch ports Pf[1] to Pf[3], a user port Pu, a distribution table 15, a relay executing unit 16 and a distribution identifier calculating unit 17. Here, the case where the system of FIG. 1 has three fabric switches FS[1] to FS[3] is taken as an example, and the fabric-switch ports Pf[1] to Pf[3] are connected to the fabric switches FS[1] to FS[3] by the sub-links SL[1] to SL[3], respectively. The LAG between sub-links (that is, main link ML) is set to the sub-links SL[1] to SL[3].

Also, in this example, each of the sub-links SL[1] and SL[2] is composed of three links 11. In accordance with this, the fabric-switch port Pf[1] includes three fabric-switch ports Pf[1,1], Pf[1,2] and Pf[1,3], and the fabric-switch port Pf[2] includes three fabric-switch ports Pf[2,1], Pf[2,2] and Pf[2,3]. The sub-link SL[3] is composed of two links 11, and in accordance with this, the fabric-switch port Pf[3] is composed of two fabric-switch ports Pf[3,1] and Pf[3,2]. The LAG in sub-link is set to each of the sub-links SL[1], SL[2] and SL[3].

When the distribution identifier calculating unit (first distribution identifier calculating unit) 17 receives a frame or packet at the user port Pu, it performs a logical operation with a predetermined operational expression while inputting a predetermined bit region in a header contained in the frame or packet, thereby calculating a j-bit (here, 3-bit) distribution identifier DID. The distribution table (first distribution table) 15 indicates a correspondence relation between the sub-links SL[1] to SL[3] and the distribution identifier DID. The distribution table 15 is generated by the port switch PSb based on a predetermined distribution rule. The relay executing unit (first relay executing unit) 16 relays the frame or packet received at the user port Pu to the sub-link corresponding to the j-bit (3-bit) distribution identifier DID calculated in the distribution identifier calculating unit 17 based on the distribution table 15.

Although not particularly limited, the port switch PSb generates the distribution table 15 based on the following distribution rule. First, the port switch PSb divides a parameter of the distribution identifier DID (in this example, 8 corresponding to 3 bits) by the number of sub-links (here, 3) and then determines the number of distribution identifiers DID assigned to each sub-link based on a quotient and a remainder thereof. Specifically, the distribution identifiers corresponding to the quotient (here, 2) are assigned to each sub-link and the distribution identifiers corresponding to the remainder (here, 2) are sequentially distributed one by one to each sub-link.

As a result, the numbers of distribution identifiers DID assigned to the sub-links SL[1], SL[2] and SL[3] are three, three and two, respectively. Thereafter, the port switch PSb sequentially assigns the eight distribution identifiers DID so as to be packed to each sub-link based on the determined numbers, thereby generating the distribution table 15. In this manner, as shown in the relay executing unit 16, the distribution identifiers DID of "0-2", "3-5" and "6, 7" are assigned to the sub-links SL[1], SL[2] and SL[3], respectively. For example, the distribution identifier DID=7 corresponds to a decimal number of the 3-bit distribution identifier DID="111".

Here, for example, the case where the frame FL1b containing a destination IP address (DIP) of "192.168.1.1" and a source IP address (SIP) of "192.168.1.15" is received at the user port Pu is assumed. In this case, the distribution identifier calculating unit 17 performs a logical operation with a predetermined operational expression while inputting the destination IP address (DIP) and the source IP address (SIP), thereby calculating the 3-bit distribution identifier DID. In this example, "DID=6" is calculated as the distribution identifier DID. As a result, the relay executing unit 16 relays the frame FL1b to the sub-link SL[3] corresponding to this "DID=6" (that is, fabric switch FS[3]).

Note that the bit number of the distribution identifier DID (that is, parameter (here, 8)) is desirably a fixed number based on the specifications of the relay executing unit 16. Specifically, first, the relay executing unit 16 is desirably composed of hardware (so-called switch LSI) in order to perform the load distribution by LAG at high speed. In this case, the maximum number of distributions at the time of performing the load distribution by LAG is determined in accordance with the specifications of the hardware. The maximum number of distributions of the port switch PSb of FIG. 2 is eight distributions, and accordingly up to eight fabric switches FS can be connected thereto.

As the parameter of the distribution identifier DID (here, 8), a fixed number having a value equal to this maximum number of distributions (eight distributions) is desirably used. For example, when LAG is set to eight links 11 corresponding to the maximum number of distributions, each one distribution identifier DID can be assigned to each link 11, and when LAG is set to four links 11 less than the maximum number of distributions, each two distribution identifiers DID can be assigned to each link 11. Also, since the distribution identifier calculating unit 17 performs the load distribution by LAG at high speed like the relay executing unit 16, the distribution identifier calculating unit 17 is desirably composed of hardware. Also from this viewpoint, a fixed number is desirably used as the parameter (bit number) of the distribution identifier DID. Note that, since the above-described process of generating the distribution table 15 does not exert any particular influence on the communication speed, it can be performed by the software process using CPU (Central Processing Unit) or the like.

<<Outline of Port Switch (Type A)>>

Figure 3:
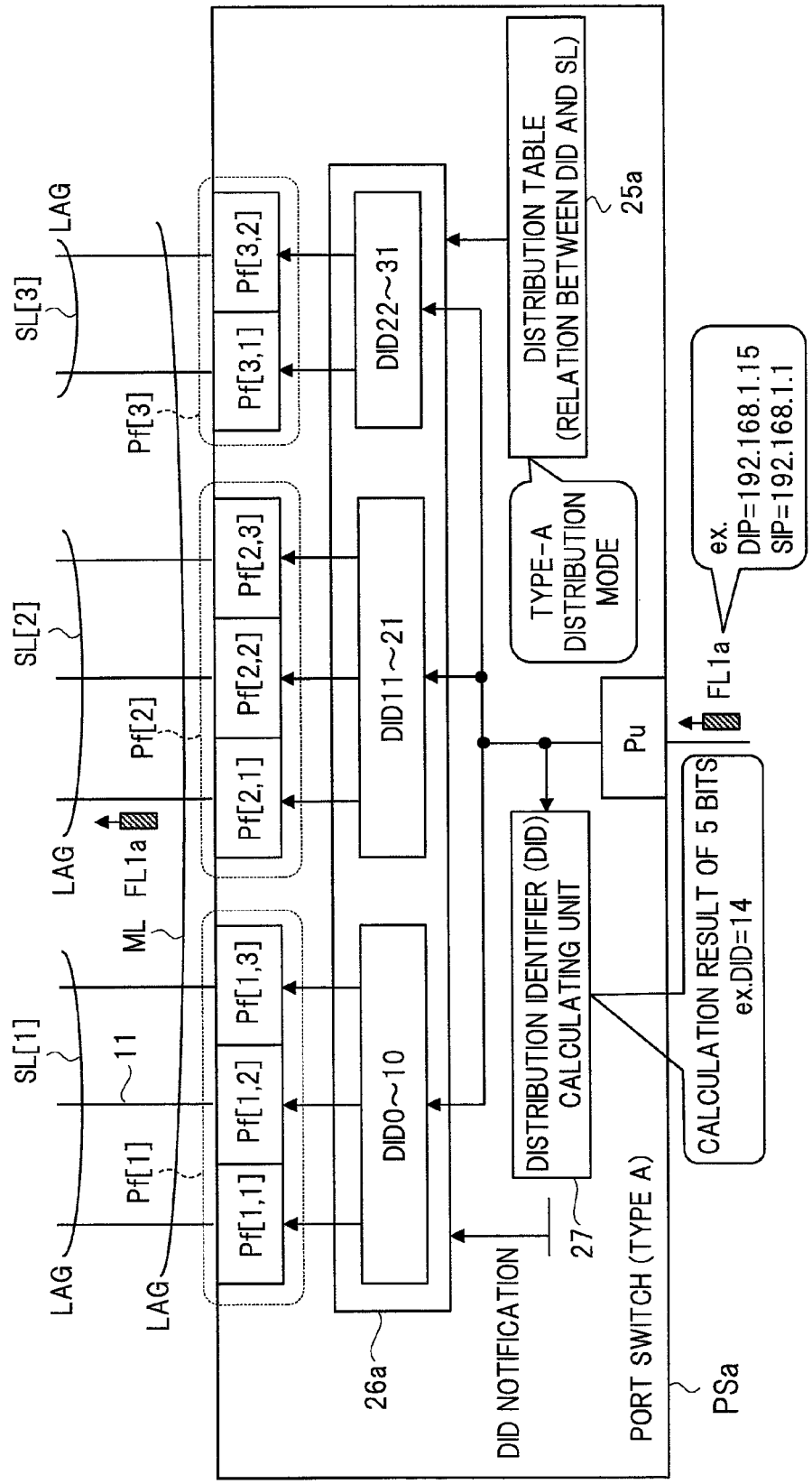
FIG. 3 is a block diagram showing a schematic configuration example of a main part of a port switch and an operation example thereof different from those of FIG. 2 in the network relay system of FIG. 1.

FIG. 3 is a block diagram showing a schematic configuration example of a main part of a port switch and an operation example thereof different from those of FIG. 2 in the network relay system of FIG. 1. A port switch (second switching device) PSa of a type A shown in FIG. 3 differs from the configuration example of FIG. 2 in the contents of a distribution table 25a and the configuration of a relay executing unit 26a and a distribution identifier calculating unit 27. Since the configuration other than those is identical to that of FIG. 2, the detailed description thereof will be omitted.

The distribution identifier calculating unit (second distribution identifier calculating unit) 27 performs a logical operation with the same operational expression while inputting the same bit region as those of the case of FIG. 2. However, unlike the case of FIG. 2, it calculates a k-bit (here, 5-bit) distribution identifier DID larger than the j-bit distribution identifier. The distribution table (second distribution table) 25a indicates a correspondence relation between the sub-links SL[1] to SL[3] and the distribution identifier DID different from that of the case of FIG. 2 in conformity to the difference in the bit number of the distribution identifier DID. The relay executing unit (second relay executing unit) 26a relays the frame or packet received at the user port Pu to the sub-link corresponding to the k-bit (5-bit) distribution identifier DID calculated in the distribution identifier calculating unit 27 based on the distribution table 25a.

As described above, the maximum number of distributions of the port switch PSa of FIG. 3 is 32 distributions unlike the port switch PSb of FIG. 2, and accordingly the bit number of the distribution identifier DID becomes 5 bits (that is, parameter is 32). More specifically, the port switch PSa can connect up to 32 fabric switches FS. If the distribution table 25a is determined by the same distribution rule as that of the case of FIG. 2, the numbers of distribution identifiers DID assigned to the sub-links SL[1], SL[2] and SL[3] are 11, 11 and 10, respectively. As a result, as shown in the relay executing unit 26a, the distribution identifiers DID of "0-10", "11-21" and "22-31" are assigned to the sub-links SL[1], SL[2] and SL[3], respectively.

Here, for example, the case where the frame FL1a containing a destination IP address (DIP) of "192.168.1.15" and a source IP address (SIP) of "192.168.1.1" is received at the user port Pu is assumed. In the frame FL1a, the destination and the source are exchanged with respect to the frame FL1b shown in FIG. 2, and the frame FL1a is, for example, a response frame to the frame FL1b. The distribution identifier calculating unit 27 performs a logical operation with a predetermined operational expression while inputting the destination IP address (DIP) and the source IP address (SIP), thereby calculating the 5-bit distribution identifier DID. In this example, "DID=14" is calculated as the distribution identifier DID. As a result, the relay executing unit 26a relays the frame FL1a to the sub-link SL[2] corresponding to this "DID=14" (that is, fabric switch FS[2]).

As described above, since the port switch (type B) PSb of FIG. 2 and the port switch (type A) PSa of FIG. 3 differ in the bit number (parameter) of the distribution identifier, even if the logical operation is performed with the same operational expression while inputting the same information, different distribution identifiers DID may be generated. Furthermore, since the distribution table is also generated by reflecting the parameter of the distribution identifier DID, when the parameters differ, the correspondence relation between each sub-link SL and the distribution identifier DID may also differ.

As a result, as shown in FIG. 2 and FIG. 3, the bidirectional communication between two terminals maybe performed through different fabric switches FS.

<<Problem in Case Where Port Switches Having Different Specifications are Present in Combination>>

Figure 4:
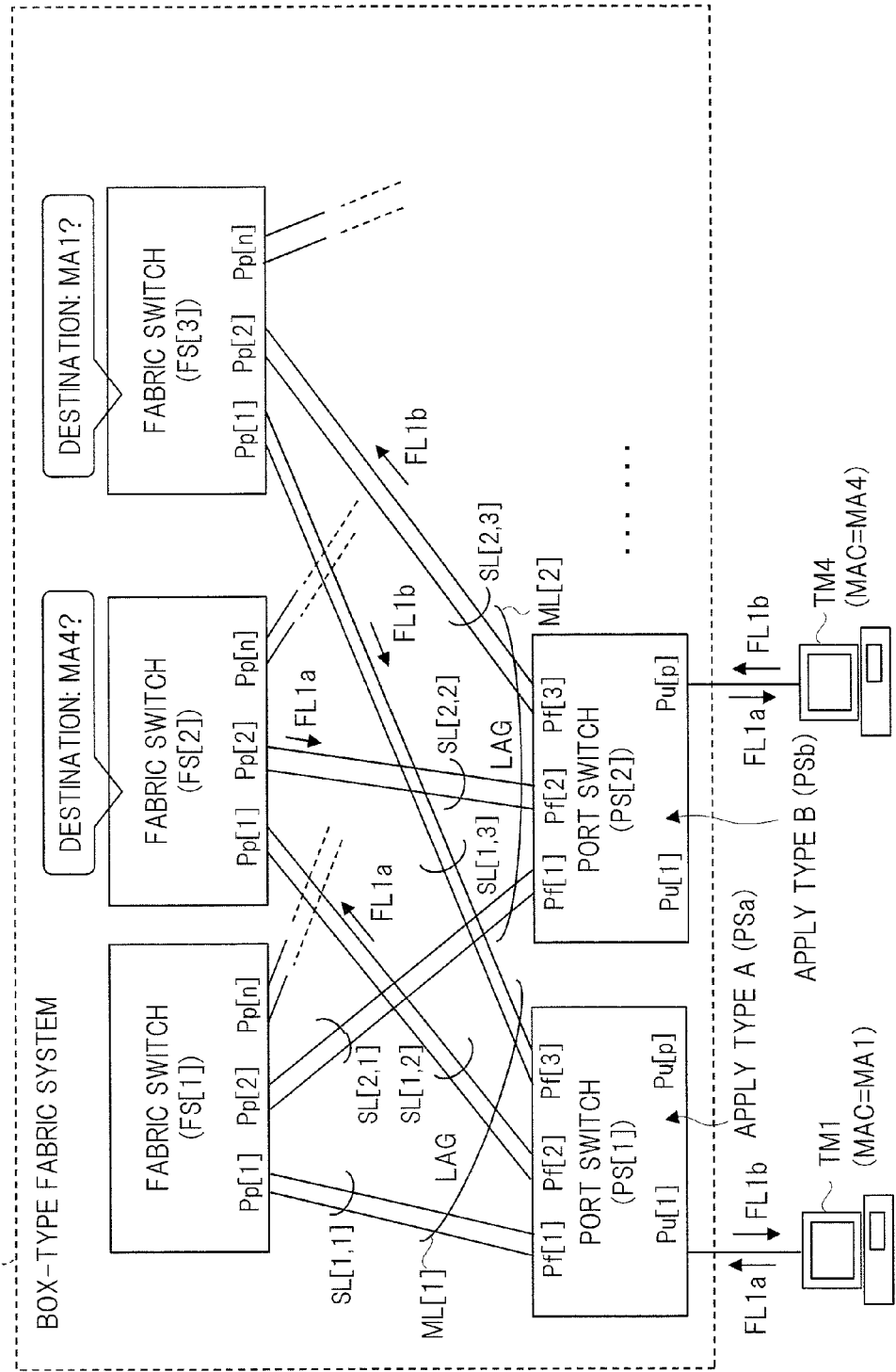
FIG. 4 is an explanatory diagram showing an example of the problem in the case where port switches having different specifications are present in combination in the network relay system of FIG. 1.

FIG. 4 is an explanatory diagram showing an example of the problem in the case where port switches having different specifications are present in combination in the network relay system of FIG. 1. FIG. 4 shows a configuration example of apart of the box-type fabric system 10 of FIG. 1, in which the number of fabric switches FS "m" is set to 3. In the example of FIG. 4, the port switch (type A) PSa shown in FIG. 3 is applied as the port switch PS[1] and the port switch (type B) PSb shown in FIG. 2 is applied as the port switch PS[2].

As shown in FIG. 3, for example, the port switch PS[1] transfers the frame FL1a received from the terminal TM1 having the MAC (Media Access Control) address "MA1" to the terminal TM4 connected to the port switch PS[2] through the fabric switch FS[2]. On the other hand, as shown in FIG. 2, for example, the port switch PS[2] transfers the frame FL1b received from the terminal TM4 having the MAC address "MA4" to the terminal TM1 connected to the port switch PS[1] through the fabric switch FS[3].

Here, since the fabric switch FS[2] does not receive the frame from the terminal TM4, if the operation like this is performed for a predetermined period, the fabric switch FS[2] deletes the MAC address "MA4" from its own address table (that is, relation between each port and MAC address present ahead of each port) due to the so-called aging. Consequently, from then on, the fabric switch FS[2] generates flooding every time when it receives the frame FL1a from the terminal TM1 because the destination MAC address thereof is unknown.

Similarly, since the fabric switch FS[3] does not receive the frame from the terminal TM1, it deletes the MAC address "MA1" from its own address table. From then on, the fabric switch FS[3] generates flooding every time when it receives the frame FL1b from the terminal TM4 because the destination MAC address thereof is unknown. When the flooding like this is generated, the communication band is degraded. Therefore, it is desired that each of the port switches PS[1] and PS[2] distributes the frames so that when the frame FL1a passes through the fabric switch FS[2], the frame FL1b also passes through the same fabric switch FS[2].

<<Outline of Distribution Identifier Calculating Unit>>

Figure 5A:
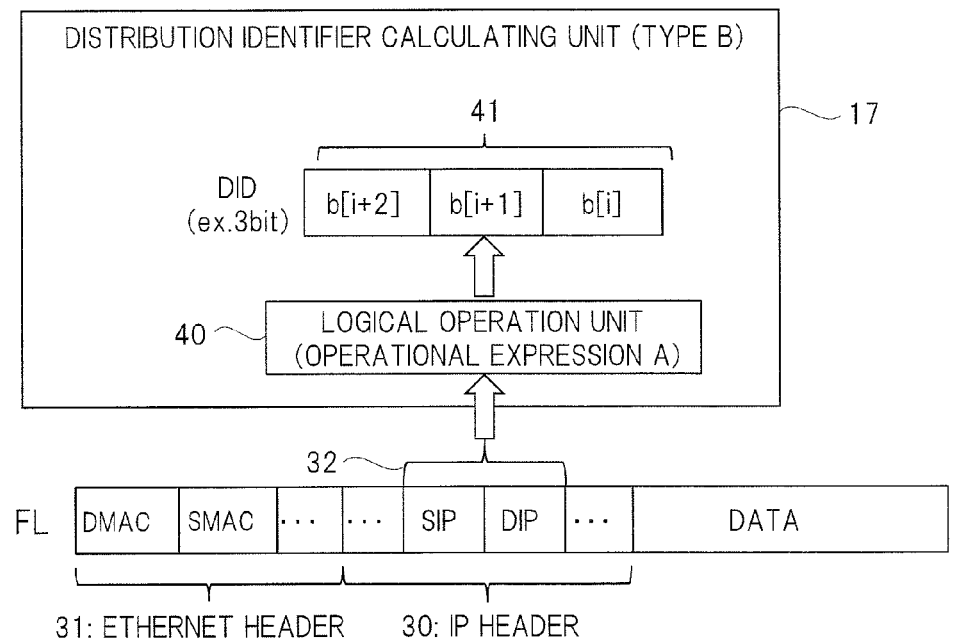
FIG. 5A is a conceptual diagram showing a configuration example of a distribution identifier calculating unit in the port switch (type B) of FIG. 2.
Figure 5B:
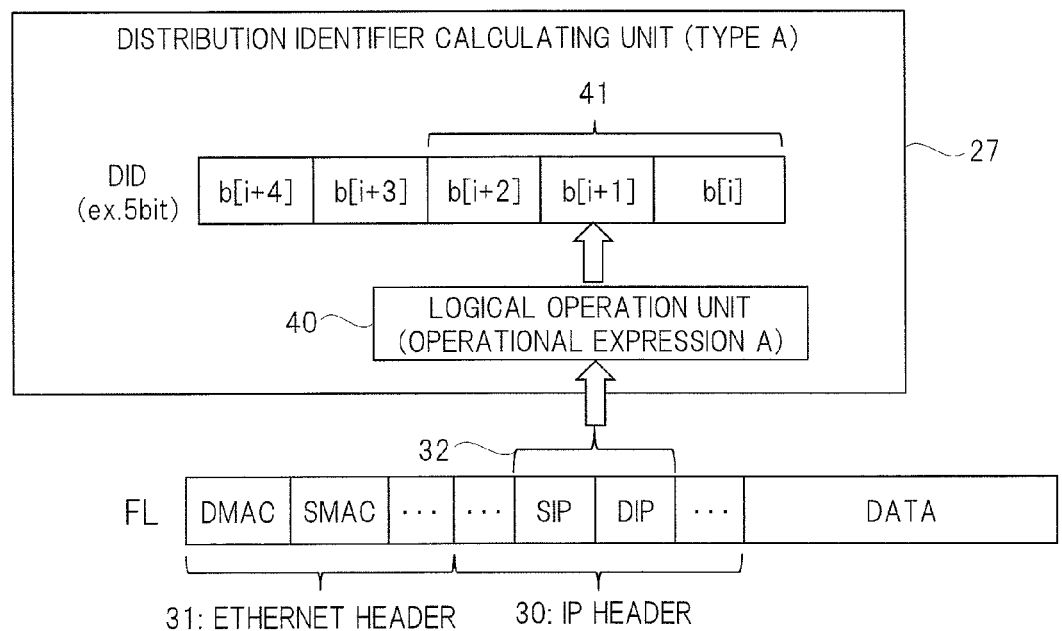
FIG. 5B is a conceptual diagram showing a configuration example of a distribution identifier calculating unit in the port switch (type A) of FIG. 3.

FIG. 5A is a conceptual diagram showing a configuration example of a distribution identifier calculating unit in the port switch (type B) of FIG. 2, and FIG. 5B is a conceptual diagram showing a configuration example of a distribution identifier calculating unit in the port switch (type A) of FIG. 3. When the distribution identifier calculating unit (first distribution identifier calculating unit) 17 shown in FIG. 5A receives the frame (or packet) FL, it performs a logical operation with a predetermined operational expression A while inputting a predetermined bit region 32 in a header contained in the frame (or packet) FL, thereby calculating a j-bit (here, 3-bit) distribution identifier DID.

Specifically, the frame (or packet) FL has a configuration in which an IP (Internet Protocol) header 30 and an Ethernet header 31 are added to data. In the IP header 30, a destination IP address (DIP) and a source IP address (SIP) are stored, and in the Ethernet header 31, a source MAC address (SMAC) and a destination MAC address (DMAC) are stored. Here, as the above-mentioned predetermined bit region 32 in the header, the region in which the destination IP address (DIP) and the source IP address (SIP) are stored is used.

The distribution identifier calculating unit 17 is provided with a logical operation unit 40 which performs a logical operation with the operational expression A while inputting the predetermined bit region 32. The logical operation unit 40 outputs the logical operation result as a j-bit (3-bit) distribution identifier DID. Here, as described above, in order to make the bidirectional communication pass through the same fabric switch FS, the destination IP address (DIP) and the source IP address (SIP) in which the same address values in bi-direction are stored are used as the bit region 32. More specifically, it is only necessary to use the destination address and the source address as a set, and from this viewpoint, it is also possible to use the source MAC address (SMAC) and the destination MAC address (DMAC) as the bit region 32.

On the other hand, the distribution identifier calculating unit (second distribution identifier calculating unit) 27 shown in FIG. 5B performs a logical operation with the same predetermined operational expression A as that of the distribution identifier calculating unit 17 while inputting the same bit region 32 as that of the distribution identifier calculating unit 17, thereby calculating a k-bit (k>j, here, 5-bit) distribution identifier DID partly containing the same j-bit (3-bit) bit region 41 as that of the distribution identifier calculating unit 17. Specifically, the distribution identifier calculating unit 27 is provided with a logical operation unit 40 which performs a logical operation with the operational expression A while inputting the bit region 32 like the distribution identifier calculating unit 17. However, the logical operation unit 40 outputs the logical operation result as a k-bit (5-bit) distribution identifier DID. Therefore, the values of the bit region 41 located in the lower 3 bits (b[i+2], b[i+1] and b[i]) in the 5 bits (b[i+4], b[i+3], ..., and b[i]) of the distribution identifier calculating unit 27 are matched with the values of the 3 bits of the distribution identifier calculating unit 17.

<<Outline of Distribution Table>>

FIG. 6A is a conceptual diagram showing a configuration example of the distribution table in the port switch (type B) of FIG. 2, and FIG. 6B is a conceptual diagram showing a configuration example in the case where the distribution table in the port switch (type A) of FIG. 3 is generated in a backward-compatible distribution mode. As described with reference to FIG. 5A and FIG. 5B, the values of the j bits (b[i+2], b[i+1] and b[i]) in the k bits of the k-bit (5-bit) distribution identifier DID in the port switch (type A) PSa are matched with the values of the j bits of the j-bit (3-bit) distribution identifier DID in the port switch (type B) PSb. Thus, the port switch (type A) PSa substantially determines the sub-link SL by the values of the j bits (b[i+2], b[i+1] and b[i]) in the k bits, and further determines the correspondence relation between the values of the j bits in the k bits at this time and the sub-link SL in the same way as that of the port switch (type B) PSb.

Specifically, in the example of FIG. 6A, first, in the distribution table 15 of the port switch (type B) PSb of FIG. 2, the sub-link identifier (sub-link ID) {SL[0]} corresponds to "000" and "001" of the 3-bit distribution identifier DID. Also, the sub-link ID {SL[3]} corresponds to "111" of the 3-bit distribution identifier DID. Here, for example, the sub-link ID {SL[0]} means an identifier attached to the sub-link SL[0]. Similarly, {AA} means an identifier attached to AA.

In the case of FIG. 6A, the distribution table 25b in the port switch (type A) PSa of FIG. 3 has the contents in which the j-bit (3-bit) distribution identifier DID in the distribution table 15 is replaced with the k-bit (5-bit) distribution identifier DID partly containing the same j-bit value as that of the j-bit distribution identifier DID as shown in FIG. 6b. For example, the distribution table 25b has the contents in which the 3-bit distribution identifier DID of "000" in the distribution table 15 is replaced with the 5-bit distribution identifiers DID of "00000", "01000", "10000" and "11000" partly containing the same value as that of the 3-bit distribution identifier DID. Similarly, the distribution table 25b has the contents in which the 3-bit distribution identifier DID of "111" in the distribution table 15 is replaced with the 5-bit distribution identifiers DID of "00111", "01111", "10111" and "11111" partly containing the same value as that of the 3-bit distribution identifier DID.

Consequently, for example, when the port switch (type B) PSb receives the frame which generates the distribution identifier DID of "001", it relays the frame to the sub-link SL[0] based on FIG. 6A and transfers the frame to the port switch (type A) PSa through the fabric switch FS[0]. On the other hand, the port switch (type A) PSa which has received a response frame to that frame generates any one of the distribution identifiers DID of "00001", "01001", "10001" and "11001" and relays the response frame to the same sub-link SL[0] based on FIG. 6B.

Here, the distribution table 25b of FIG. 6B can be generated by simply generating the distribution table 15 of FIG. 6A and then replacing the j-bit distribution identifier DID in the distribution table 15 with the k-bit distribution identifier DID as described above. The process like this can be executed by the program processing by CPU. Also, the distribution table 25b shown in FIG. 6B is generated in the case where the port switches PS include the port switch (type A) PSa and the port switch (type B) PSb as shown in FIG. 4. More specifically, the distribution table 25b is generated when the port switch (type A) PSa is operated in a backward-compatible distribution mode (second distribution mode).

Meanwhile, in the case where the port switches PS in FIG. 1 are all composed of the port switches (type A) PSa, the port switch (type A) PSa can generate the distribution table in a normal type-A distribution mode (first distribution mode). In this type-A distribution mode, the port switch (type A) PSa generates the distribution table 25a based on the original predetermined rule on the premise of the k-bit distribution identifier DID as shown in FIG. 3. Depending on the viewpoint, the type-A distribution mode can be regarded as the distribution mode of "j=k" in the backward-compatible distribution mode.

<<Outline of Port Switch (Type A) (in Backward-Compatible Distribution Mode)>>

Figure 7:
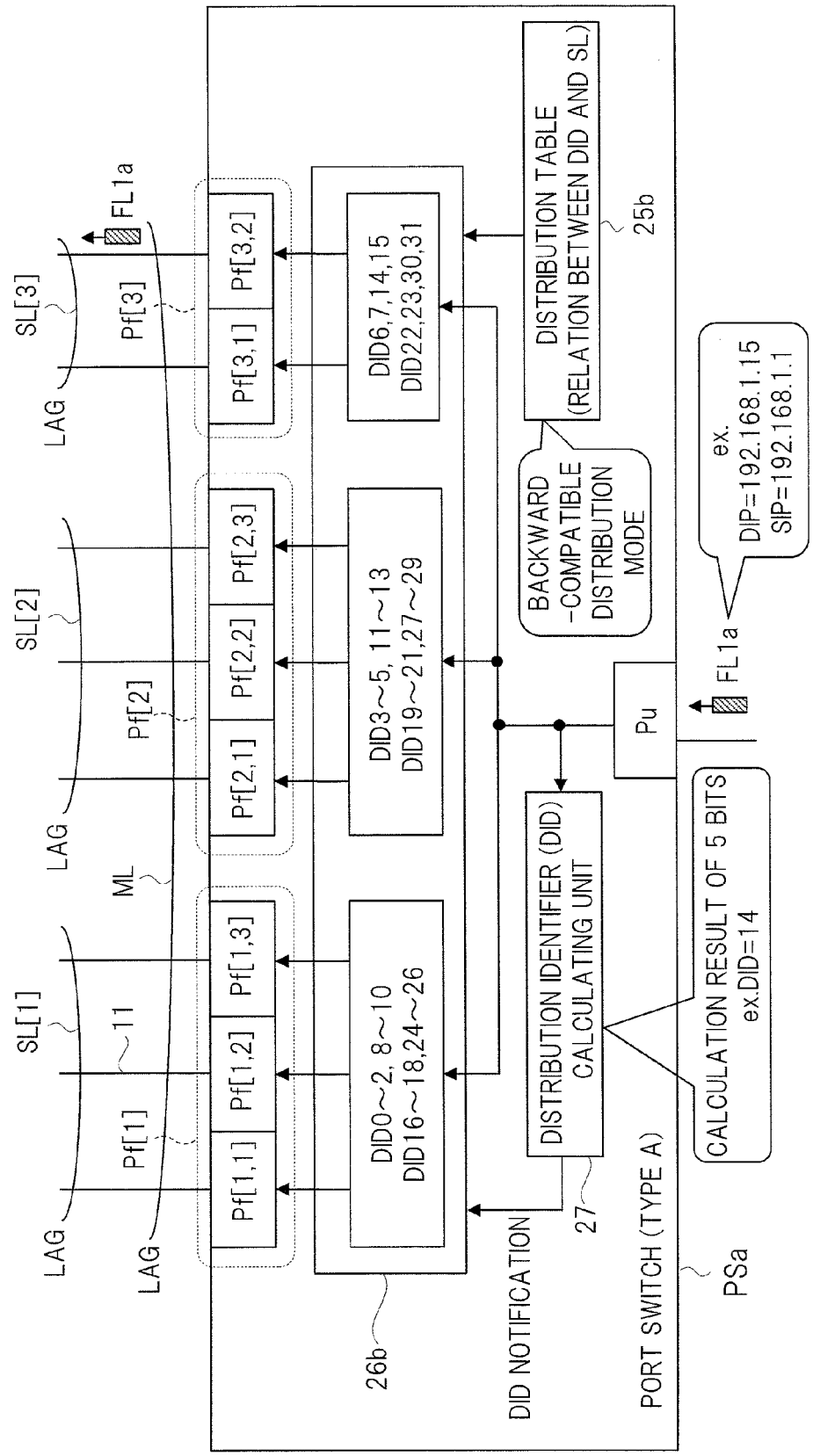
FIG. 7 is a block diagram showing a configuration example and an operation example at the time when the port switch of FIG. 3 is operated in the backward-compatible distribution mode.

FIG. 7 is a block diagram showing a configuration example and an operation example at the time when the port switch of FIG. 3 is operated in the backward-compatible distribution mode. The port switch PSa shown in FIG. 7 differs from the configuration example of FIG. 3 in the configuration of the distribution table 25b in conformity to the backward-compatible distribution mode (second distribution mode) and the configuration of a relay executing unit 26b in conformity to the configuration of the distribution table 25b. The relay executing unit 26b is the same as that of FIG. 3 in hardware circuit configuration, but is different from that of FIG. 3 in the contents set to the hardware. Since the configuration other than those is identical to that of FIG. 3, the detailed description thereof will be omitted.

The distribution table 25b is generated in the manner described with reference to FIG. 6 based on the distribution table 15 of the port switch (type B) PSb of FIG. 2. As a result, as shown in the relay executing unit 26b, in addition to the distribution identifiers DID of "0-2", the distribution identifiers DID of "8-10", "16-18" and "24-26" partly containing the same 3-bit value are assigned to the sub-link SL[1]. Also, in addition to the distribution identifiers DID of "3-5", the distribution identifiers DID of "11-13", "19-21" and "27-29" partly containing the same 3-bit value are assigned to the sub-link SL[2]. Similarly, in addition to the distribution identifiers DID of "6, 7", the distribution identifiers DID of "14, 15", "22, 23" and "30, 31" are assigned to the sub-link SL[3].

Here, like the case of FIG. 3, the case where the frame FL1a containing a destination IP address (DIP) of "192.168.1.15" and a source IP address (SIP) of "192.168.1.1" is received at the user port Pu is assumed. In this case, the distribution identifier calculating unit 27 calculates "DID=14" as the distribution identifier DID in the same manner as the case of FIG. 3. As a result, the relay executing unit 26b relays the frame FL1a to the sub-link SL[3] (that is, fabric switch FS[3]) corresponding to this "DID=14". As described above, by using the port switch (type A) PSa of FIG. 7, the frame can be relayed to the same fabric switch FS as the port switch (type B) PSb of FIG. 2 unlike the case of FIG. 3.

FIG. 8 is a diagram showing a detailed configuration example of the distribution table 25b in the port switch (type A) of FIG. 7. The distribution table 25b shown in FIG. 8 indicates the correspondence relation between the sub-link ID and the distribution identifier DID and further the correspondence relation between one or plural links 11 constituting each sub-link and the distribution identifier DID. For example, the sub-link ID {SL[3]} corresponds to the distribution identifiers DID of "6, 7", "14, 15", "22, 23" and "30, 31" as described with reference to FIG. 7. Among these, the distribution identifiers DID of "6, 22, 7, 23" are assigned to the link 11 corresponding to the port identifier (port ID) {Pf[3, 1]}. Also, the distribution identifiers DID of "14, 30, 15, 31" are assigned to the link 11 corresponding to the port ID {Pf[3, 2]}.

In this case, in more detail, the frame FL1a having the distribution identifier DID of "14" described with reference to FIG. 7 is relayed to the link 11 corresponding to the fabric-switch port Pf[3,2] in the sub-link SL[3]. As described above, the distribution table 25b shown in FIG. 8 is generated by reflecting the LAG in sub-link in addition to the LAG between sub-links as described with reference to FIG. 1. More specifically, the distribution table 25b shown in FIG. 8 is generated by assigning the distribution identifier DID corresponding to each sub-link to one or plural links constituting each sub-link (here, fabric-switch port Pf) based on a predetermined distribution rule.

This predetermined distribution rule (that is, distribution rule of LAG in sub-link) is not particularly limited, but a round-robin method is used here. For example, the distribution identifiers DID of the sub-link ID {SL[3]} are "6", "14, 22, 30" whose 3 bits are in common to "6", "7", and "15, 23, 31" whose 3 bits are in common to "7". After arranging these in an order to "6, 14, 22, 30, 7, 15, 23, 31", these are assigned to the fabric-switch ports Pf[3,1] and Pf[3,2] by the round-robin method, thereby obtaining the distribution table 25b of FIG. 8. Note that, since the distribution rule of the LAG in sub-link is irrelevant to the problem described with reference to FIG. 4, various distribution rules can be adopted as long as the rule can perform the substantially uniform distribution in the sub-links.

<<Detail of Port Switch (Type A)>>

Figure 9:
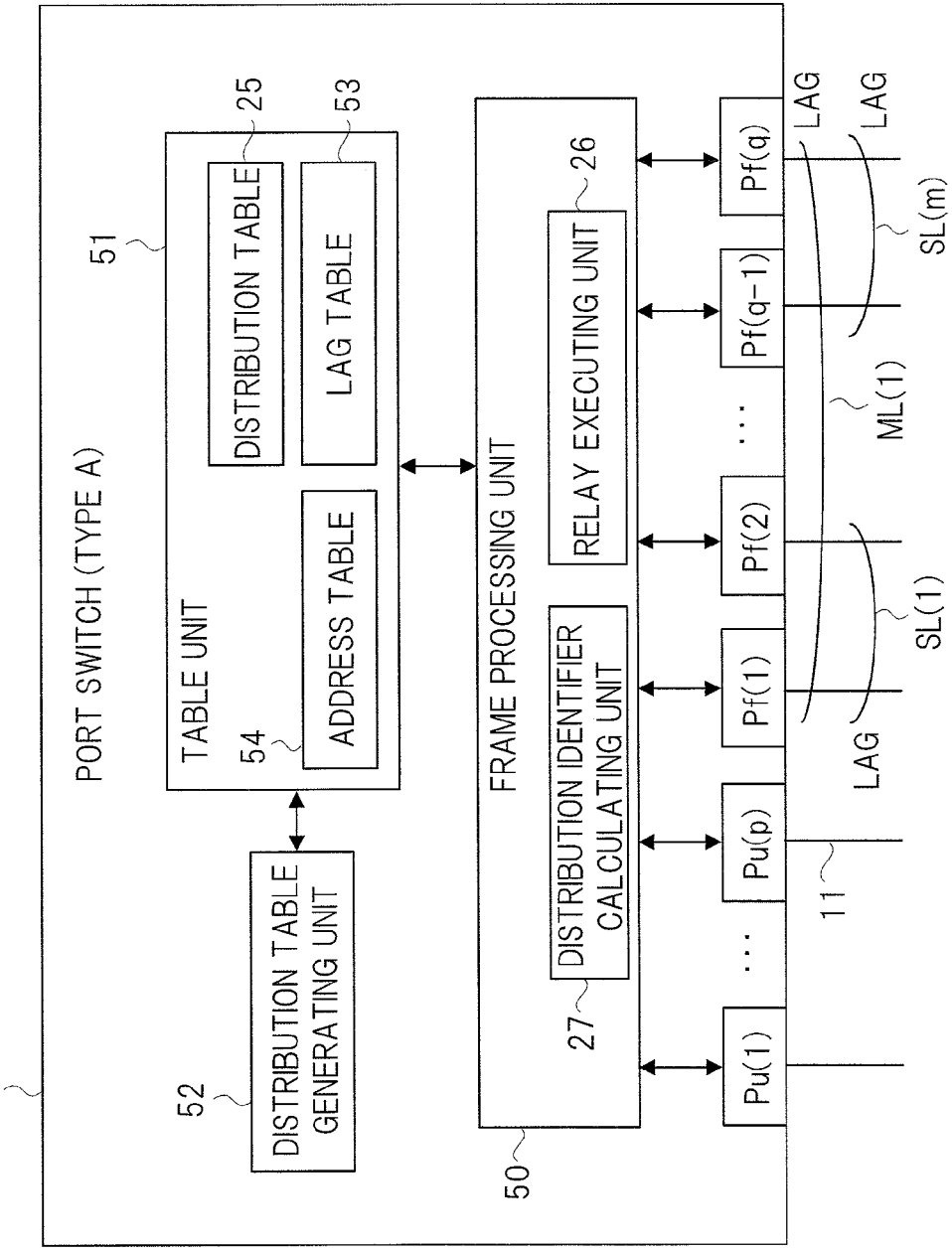
FIG. 9 is a block diagram showing a schematic configuration example of a main part of the port switch (type A) in the network relay system of FIG. 1.

FIG. 9 is a block diagram showing a schematic configuration example of a main part of the port switch (type A) in the network relay system of FIG. 1. The port switch (second switching device) PSa shown in FIG. 9 includes, for example, a frame processing unit 50, a table unit 51, a distribution table generating unit 52, and a plurality of ports (user ports Pu(1) to Pu(p) and fabric-switch ports Pf(1) to Pf(q)). Terminals and others are properly connected to the user ports Pu(1) to Pu(p) through communication lines.

Each of the fabric-switch ports Pf(1) to Pf(q) is connected to any one of the m fabric switches FS[1] to FS[m] through communication lines. In this example, the fabric-switch ports Pf(1) and Pf(2) constitute the sub-link SL(1) and are connected to the fabric switch FS[1] by the sub-link SL(1). Also, the fabric-switch ports Pf(q-1) and Pf(q) constitute the sub-link SL(m) and are connected to the fabric switch FS[m] by the sub-link SL(m). The LAG between sub-links (that is, main link ML(1)) is set to the sub-links SL(1) to SL(m). Also, the LAG in sub-link is set to each of the sub-link SL(1) and SL(m).

The table unit 51 includes a distribution table 25, an address table 54 and a LAG table 53. The address table 54 is a table showing the relation between each port and the MAC address present ahead of each port. The LAG table 53 is a table showing the relation among the above-mentioned main link ML, the sub-link SL and the port (here, fabric-switch port Pf). The LAG table 53 can be fixedly generated in advance by an administrator or the like or can be automatically generated by using the method described in the Patent Document 1. The distribution table (second distribution table) 25 is generated by the distribution table generating unit 52 and retains the information mentioned in the description of the distribution table 25a of FIG. 3 or the information mentioned in the description of the distribution table 25b of FIG. 7 and FIG. 8.

The frame processing unit 50 includes the distribution identifier calculating unit (second distribution identifier calculating unit) 27 and the relay executing unit (second relay executing unit) 26. When the frame processing unit 50 receives a frame at each port, it retrieves a destination port by using the address table 54 and relays the received frame to the port. At this time, for example, when the destination port of the frame received at the user port Pu is the port to which the main link ML(1) is set (that is, fabric-switch port Pf), the frame processing unit 50 properly distributes the relay destination of the frame by using the distribution identifier calculating unit 27 and the relay executing unit 26. The specific process at this time is the same as that of the case of FIG. 3 and FIG. 2.

FIG. 10A is a schematic diagram showing a configuration example of the address table in FIG. 9, and FIG. 10B is a schematic diagram showing a configuration example of the LAG table in FIG. 9. The LAG table 53 shown in FIG. 10B indicates that the main link identifier (main link ID) {ML(1)} is composed of the sub-link IDs {SL(1) to SL(m)}. In other words, it indicates that the main link ML(1) is composed of the sub-links SL(1) to SL(m). Furthermore, the LAG table 53 indicates each port ID corresponding to each sub-link ID {SL(1) to SL(m)}. For example, the sub-link ID {SL(1)} is composed of the port IDs {Pf(1), Pf(2)}. In other words, the sub-link SL(1) is composed of the fabric-switch ports Pf(1) and Pf(2).

Furthermore, in this example, the LAG table 53 indicates also the state (that is, presence of fault) of each link 11 corresponding to each of the fabric-switch ports Pf(1) to Pf(q). For example, when the frame processing unit 50 detects a fault of the fabric-switch ports Pf(1) to Pf(q) by the regular transmission and reception of a control frame, it records the information to the LAG table 53. When the fault is detected, the distribution table generating unit 52 recognizes the link 11 having the fault based on the LAG table 53, and assigns the distribution identifier DID corresponding to the link 11 having the fault to a normal link 11 in the same sub-link in the distribution table 25.

The address table 54 shown in FIG. 10A indicates the relation between the port ID/main link ID and the MAC address present ahead of the port corresponding to the port ID/main link ID. For example, when the destination MAC address of the frame received at a port is "Maxx", the frame processing unit 50 of FIG. 9 relays the frame to the user port Pu(1) based on FIG. 10A.

Also, when the destination MAC address of the frame received at any one of the user ports Pu(1) to Pu(p) is "Mazz", the frame processing unit 50 relays the frame to the main link ML(1) based on FIG. 10A. At this time, the relay executing unit 26 in the frame processing unit 50 relays the frame to a predetermine link 11 based on the distribution identifier DID calculated by the distribution identifier calculating unit 27 and the correspondence relation between the distribution identifier DID and the sub-link SL (and link 11 in the sub-link SL) obtained by the distribution table 25.

<<Detail of Distribution Identifier Calculating Unit>>

Figure 11:
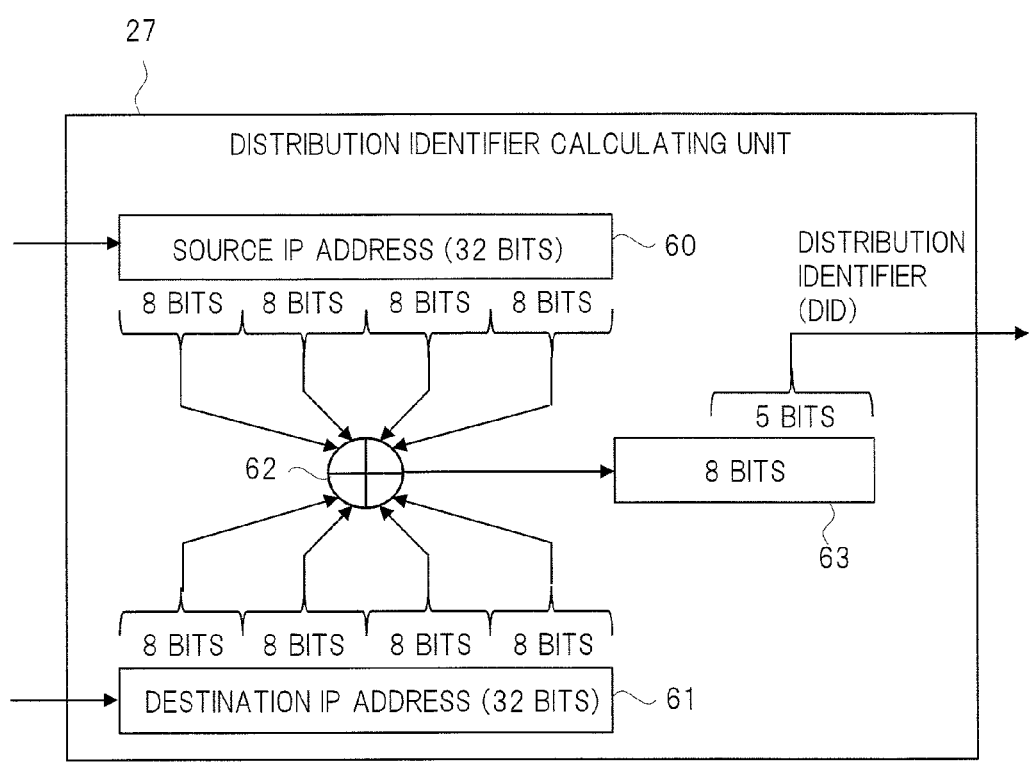
FIG. 11 is a block diagram showing a configuration example of the distribution identifier calculating unit in FIG. 9.

FIG. 11 is a block diagram showing a configuration example of the distribution identifier calculating unit in FIG. 9. The distribution identifier calculating unit 27 shown in FIG. 11 includes input registers 60 and 61, an exclusive OR operation unit 62 and an output register 63. In the register 60, a 32-bit source IP address contained in the received frame is stored. In the register 61, a 32-bit destination IP address contained in the received frame is stored. The exclusive OR operation unit 62 performs a bit-by-bit exclusive OR operation to eight 8-bit strings obtained by dividing a total of 64-bit values stored in the register 60 and the register 61 for each 8 bits. In this manner, the exclusive OR operation unit 62 outputs the 8-bit logical operation result to the output register 63, and the lower 5 bits therein are output as the distribution identifier DID.

By using the distribution identifier calculating unit 27 like this, the same distribution identifier DID can be generated even when the source IP address and the destination IP address are replaced with each other. Of course, the logical operation method of the distribution identifier calculating unit 27 is not limited to this, and any operation method can be used as long as the same distribution identifier DID can be generated even when the source address and the destination address are replaced with each other as described above.

Also, the information used as input is not always limited to address, and any identifiers capable of specifying the source and the destination can be used.

The configuration example of the distribution identifier calculating unit 27 of the port switch (type A) PSa has been described here, and the distribution identifier calculating unit 17 of the port switch (type B) PSb shown in FIG. 2 also has the same configuration. However, in the distribution identifier calculating unit 17, for example, the lower 3 bits of the output register 63 are output as the distribution identifier DID.

<<Detail of Distribution Table Generating Unit>>

Figure 12:
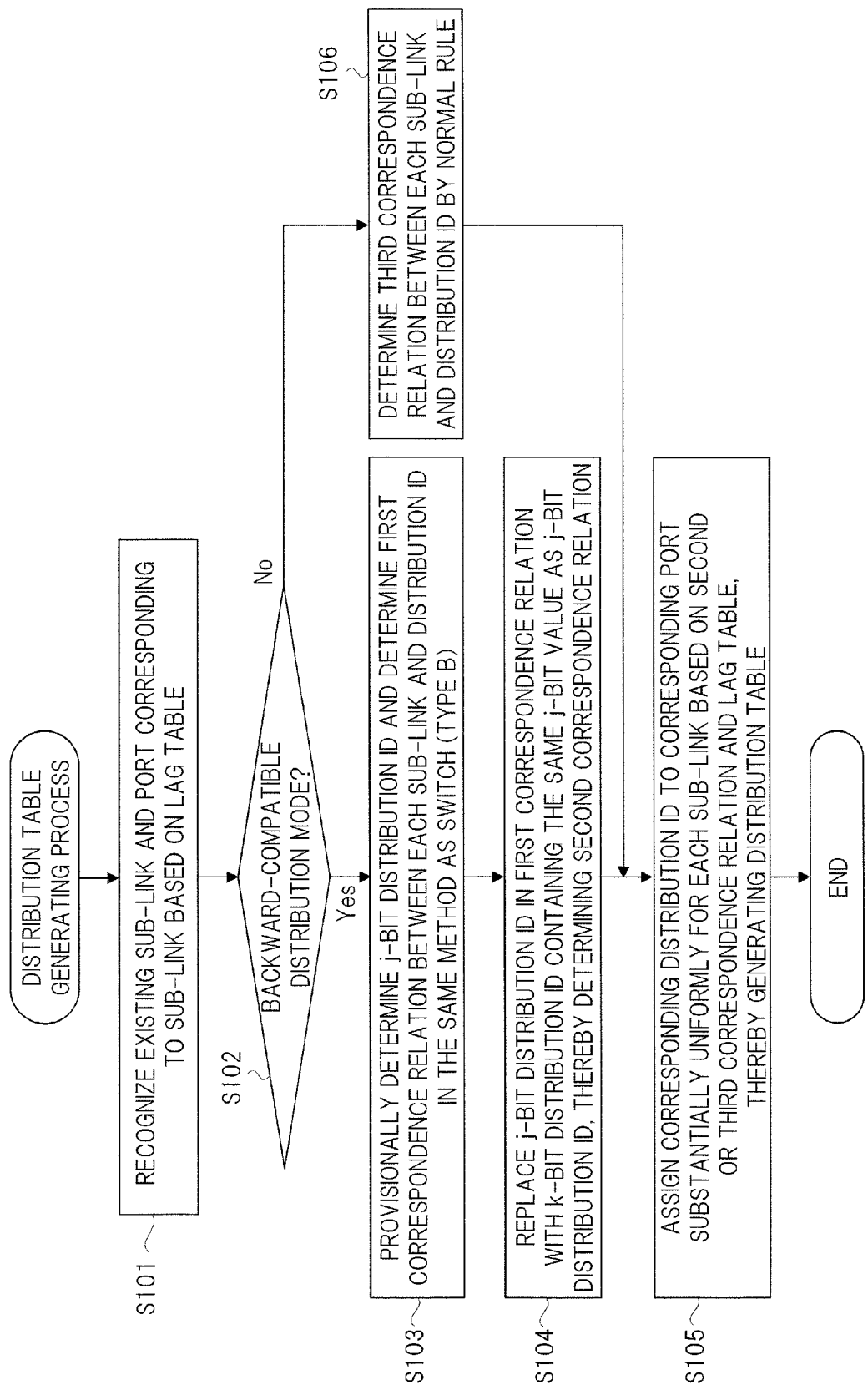
FIG. 12 is a flowchart showing an example of a process of the distribution table generating unit in FIG. 9.

FIG. 12 is a flowchart showing an example of a process of the distribution table generating unit in FIG. 9. The distribution table generating unit 52 of FIG. 9 is provided by the program processing by CPU. First, the distribution table generating unit 52 recognizes the existing sub-link (sub-link ID) and the port (port ID) corresponding to each sub-link based on the LAG table 53 shown in FIG. 10B (step S101). Next, the distribution table generating unit 52 determines whether or not the backward-compatible distribution mode (second distribution mode) described with reference to FIG. 6 and FIG. 7 is set (step S102). The distribution table generating unit 52 transitions to step S103 when the backward-compatible distribution mode is set, and transitions to step S106 when it is not set.

In the step S103, the distribution table generating unit 52 provisionally determines the j-bit distribution identifier DID as described with reference to FIG. 6A and FIG. 6B, and then determines the first correspondence relation between each sub-link SL and the j-bit distribution identifier DID based on the same rule as that of the port switch (type B) PSb (first process). Next, the distribution table generating unit 52 replaces the j-bit distribution identifier in the first correspondence relation with the k-bit distribution identifier partly containing the same j-bit value as the j-bit distribution identifier, thereby determining a second correspondence relation between each sub-link SL and the k-bit distribution identifier (step S104, second process). Thereafter, the distribution table generating unit 52 transitions to step S105.

On the other hand, in the step S106, since the backward-compatible distribution mode is not set, the distribution table generating unit 52 can generate the distribution table 25a in the normal type-A distribution mode (first distribution mode) as shown in FIG. 3. Thus, in the step S106, the distribution table generating unit 52 determines a third correspondence relation between each sub-link and the k-bit distribution identifier based on a predetermined rule (original normal distribution rule) (third process). Thereafter, the distribution table generating unit 52 transitions to step S105.

In the step S105, the distribution table generating unit 52 executes the process using the rule described with reference to FIG. 8 (that is, distribution rule of LAG in sub-link) based on the second correspondence relation (step S104) or the third correspondence relation (step S106) and the LAG table 53 in the step S101. Specifically, the distribution table generating unit 52 assigns the k-bit distribution identifier DID corresponding to each sub-link to the port corresponding to each sub-link (in other words, one or plural links 11 constituting each sub-link) based on the distribution rule capable of performing the substantially uniform distribution for each of the sub-links (fourth process). In this manner, the distribution table generating unit 52 determines the fourth correspondence relation between the link 11 constituting each sub-link and the k-bit distribution identifier, and generates the distribution table shown in FIG. 8 from the fourth correspondence relation.

As described above, by using the first embodiment, typically, the communication band can be improved in the network relay system (that is, box-type fabric system) established with switching devices (that is, port switches) having different specifications. In other words, since the switching devices having different specifications can be used in combination without any problem, the degree of freedom in the establishment (for example, extension) of the box-type fabric system can be improved.

Second Embodiment

<<Configuration and Operation of Network Relay System (Application Example)>>

Figure 13:
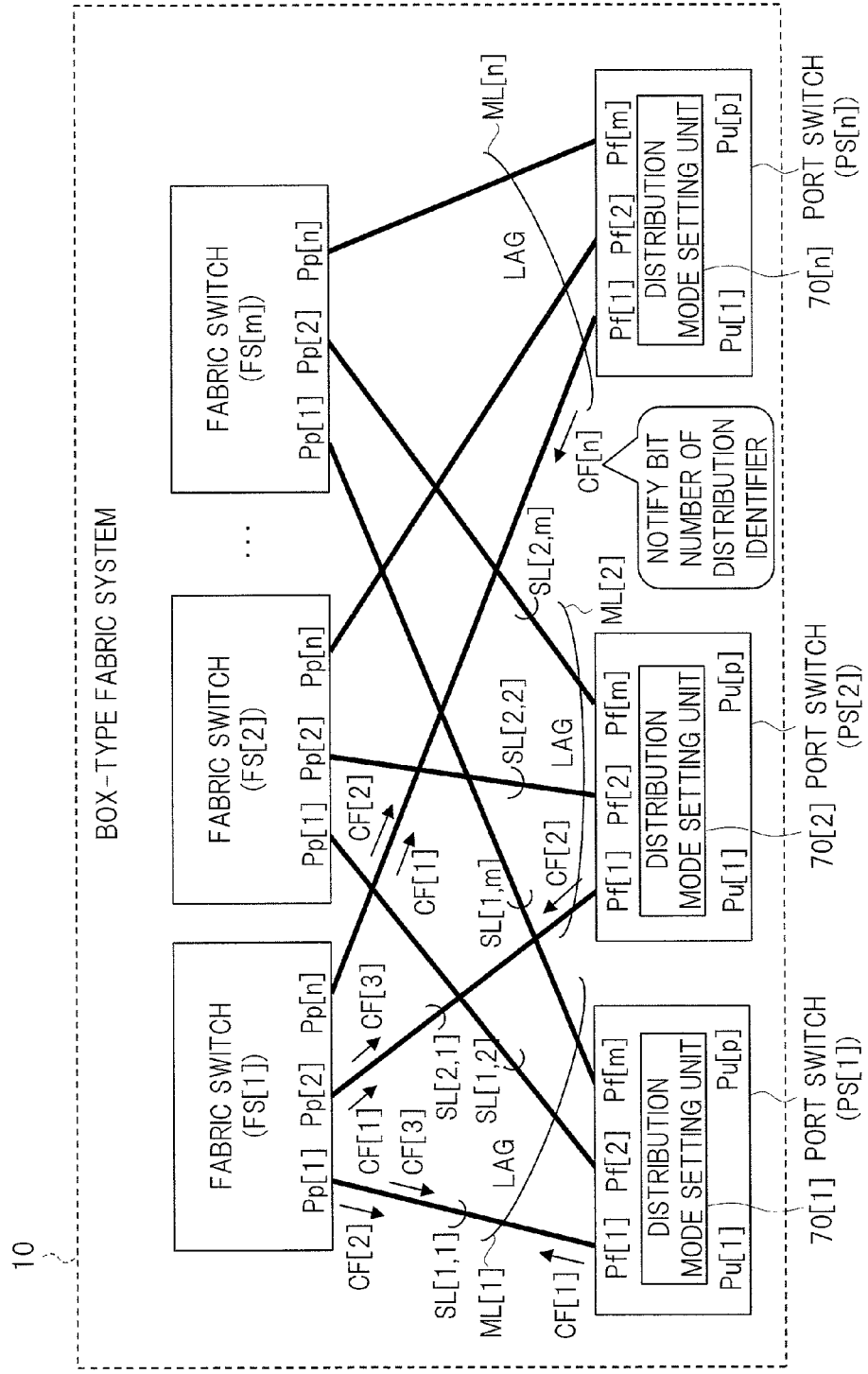
FIG. 13 is a block diagram showing a configuration example of a network relay system according to the second embodiment of the present invention and a schematic operation example thereof.

FIG. 13 is a block diagram showing a configuration example of a network relay system according to the second embodiment of the present invention and a schematic operation example thereof. In FIG. 13, the above-described configuration of the box-type fabric system 10 of FIG. 1 is shown in a simplified manner as a matter of convenience. More specifically, the illustration of the links in each sub-link SL is omitted. The substantial difference between the box-type fabric system (network relay system) 10 of FIG. 13 and the configuration example of FIG. 1 lies in the point that distribution mode setting units 70[1] to 70[n] are provided in the port switches PS[1] to PS[n], respectively.

The distribution mode setting units 70[1] to 70[n] transmit control frames CF[1] to CF[n] to predetermined ports (here, Pf[1]) in the m fabric-switch ports Pf[1] to Pf[m]. Each of the control frames CF[1] to CF[n] contains information indicating the bit number of the distribution identifier DID. For example, the distribution mode setting unit 70[1] transmits the control frame CF[1] indicating the bit number of the distribution identifier DID held by the port switch PS[1].

Figure 14:
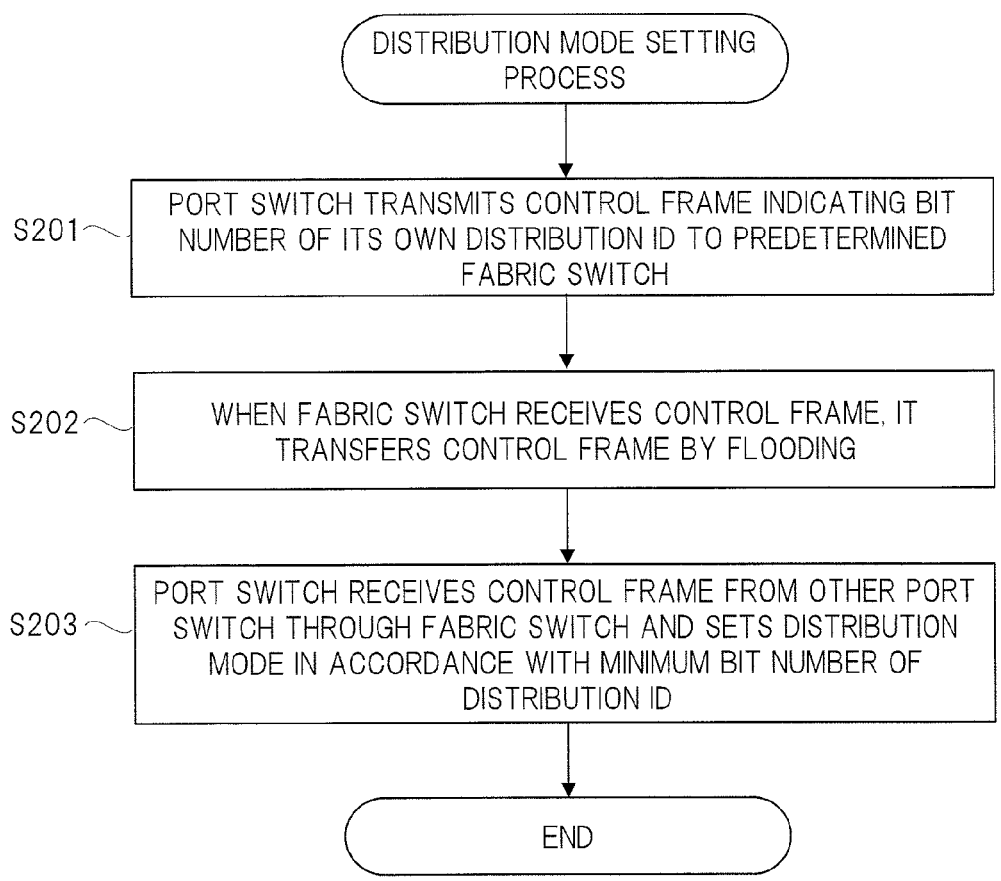
FIG. 14 is a flowchart showing an operation example of a main part in the network relay system of FIG. 13.

FIG. 14 is a flowchart showing an operation example of a main part in the network relay system of FIG. 13. In FIG. 14, first, each of the port switches PS[1] to PS[n] (distribution mode setting units 70[1] to 70[n]) transmits the control frames CF[1] to CF[n] indicating the bit number of its own distribution identifier DID to any one of the m fabric switches (here, FS[1]) (step S201, fifth process).

Next, when any one of the m fabric switches (here, FS[1]) receives the control frames CF[1] to CF[n], it transfers the control frames CF[1] to CF[n] to (n-1) port switches PS by flooding. For example, when the fabric switch FS[1] receives the control frame CF[1], it transfers the control frame CF[1] to the port switches PS[2] to PS[n] (step S202).

Subsequently, in step S203, each of the port switches PS[1] to PS[n] (distribution mode setting units 70[1] to 70[n]) receives the control frames from the other port switches PS connected to the fabric switch FS[1] through any one of the m fabric switches (here, FS[1]) (sixth process). For example, the port switch PS[1] receives the control frames CF[2] to CF[n] from the other port switches PS[2] to PS[n] connected to the fabric switch FS[1]. Then, each of the port switches PS[1] to PS[n] (distribution mode setting units 70[1] to 70[n]) recognizes the minimum bit number among the bit numbers of the distribution identifiers DID held by the port switches PS[1] to PS[n], and automatically sets the distribution mode in accordance with this.

Specifically, for example, when the port switch PS[1] is the port switch (second switching device) PSa of the type A mentioned above, the port switch PS[1] sets the type-A distribution mode (first distribution mode) when the recognized minimum bit number is the k bits, and sets the backward-compatible distribution mode (second distribution mode) when the recognized minimum bit number is less than the k bits (seventh process). The distribution table generating unit 52 shown in FIG. 9 generates a desired distribution table by the flow described with reference to FIG. 12 in accordance with the mode set by the distribution mode setting unit.

As described above, by using the second embodiment, the distribution rule in accordance with the specifications of the switching device (that is, port switch) can be automatically set in the network relay system (that is, box-type fabric system), and the load and the mistake of a network administrator can be reduced.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, two kinds of distribution modes (type-A distribution mode and backward-compatible distribution mode) are provided for the port switch (type A) PSa here, but depending on circumstances, only the backward-compatible distribution mode maybe provided. However, in the case of the backward-compatible distribution mode, from the viewpoint of performing the load distribution to the sub-links SL uniformly as shown in FIG. 7, non-uniform distribution may occur. More specifically, in the case of FIG. 7, unlike the case of FIG. 3, twelve distribution identifiers DID, twelve distribution identifiers DID and eight distribution identifiers DID are assigned to the sub-link SL[1], SL[2] and SL[3], respectively. Therefore, from this viewpoint, it is advantageous to provide two kinds of distribution modes.

Furthermore, in the descriptions of the first and second embodiments, the case where two kinds of port switches (type A and type B) are present is mainly taken as an example. However, the first and second embodiments can be similarly applied also to the case where three or more kinds of port switches are present. For example, when the bit numbers of the three kinds of port switches are x bits, k (<x) bits and j (<k) bits, respectively, the port switches having the x bits and k bits can determine the first correspondence relation to be the basis of the distribution table by provisionally determining the minimum bit number (j bits) in the manner described with reference to FIG. 6A, FIG. 6B and FIG. 12.

Furthermore, when the port switch having j bits is eliminated in this state, the port switch having x bits can similarly determine the first correspondence relation to be the basis of the distribution table by provisionally determining the minimum bit number (k bits). More specifically, as the bit number at the time of determining the first correspondence relation is closer to the x bits, the port switch having the x bits can perform more uniform load distribution to each of the sub-links. Note that the minimum bit number can be recognized by, for example, the method of the second embodiment.

What is claimed is:

1. A network relay system, comprising:
n (n is an integer of 2 or more) port switches including first and second switching devices;
m (m is an integer of 2 or more) fabric switches functioning to relay frames between the n port switches; and
a plurality of sub-links which connect the n port switches and the m fabric switches, respectively,
wherein each of the n port switches sets a link aggregation group to m sub-links which connect itself and the m fabric switches,
the first switching device includes:
a first distribution identifier calculating unit which, when it receives a frame or packet, performs a logical operation with a predetermined operational expression while inputting a predetermined bit region in a header contained in the frame or packet, thereby calculating a j-bit distribution identifier;
a first distribution table indicating a correspondence relation between the m sub-links connected to itself and the j-bit distribution identifier; and
a first relay executing unit which relays the received frame or packet to the sub-link corresponding to the j-bit distribution identifier calculated in the first distribution identifier calculating unit based on the first distribution table,
the second switching device includes:
a second distribution identifier calculating unit which, when it receives a frame or packet, performs a logical operation with the same operational expression as that of the first switching device while inputting the same bit region as that of the first switching device in a header contained in the frame or packet, thereby calculating a k-bit (k>j) distribution identifier partly containing the same j-bit bit region as that of the first switching device;
a second distribution table indicating a correspondence relation between the m sub-links connected to itself and the k-bit distribution identifier; and
a second relay executing unit which relays the received frame or packet to the sub-link corresponding to the k-bit distribution identifier calculated in the second distribution identifier calculating unit based on the second distribution table, and
the second distribution table has contents in which the j-bit distribution identifier in the first distribution table is replaced with the k-bit distribution identifier partly containing the same j-bit value as that of the j-bit distribution identifier.

2. The network relay system according to claim 1,
wherein the bit region input to the first and second distribution identifier calculating units is a region in which a destination address and a source address are stored, and
the operational expression used in the first and second distribution identifier calculating units is an expression for performing a bit-by-bit exclusive OR operation to a plurality of z-bit strings obtained by dividing the bit region for each z bits ($z \geq k$).

3. The network relay system according to claim 1,
wherein the m sub-links are composed of one or plural links,
each of the n port switches sets a link aggregation group to the plural links constituting each of the m sub-links in addition to the m sub-links,
the first distribution table indicates a correspondence relation between the one or plural links constituting each of the m sub-links and the j-bit distribution identifier,
the first relay executing unit relays the received frame or packet to a link corresponding to the j-bit distribution identifier calculated in the first distribution identifier calculating unit based on the first distribution table,
the second distribution table indicates a correspondence relation between the one or plural links constituting each of the m sub-links and the k-bit distribution identifier, and
the second relay executing unit relays the received frame or packet to a link corresponding to the k-bit distribution identifier calculated in the second distribution identifier calculating unit based on the second distribution table.

4. The network relay system according to claim 1,
wherein each of the n port switches further includes a distribution mode setting unit and a distribution table generating unit,
the distribution mode setting unit transmits a control frame indicating a bit number of its own distribution identifier to any one of the m fabric switches,
any one of the m fabric switches transfers the received control frame to (n-1) port switches by flooding,
the distribution mode setting unit recognizes a minimum bit number among bit numbers of the distribution identifiers held by the n port switches through the control frames transferred by flooding, and
the distribution table generating unit generates a distribution table indicating a correspondence relation between its own m sub-links and its own distribution identifier based on the minimum bit number recognized in the distribution mode setting unit.

5. A switching device connected to m (m is an integer of 2 or more) fabric switches by m sub-links and operated to set a link aggregation group to the m sub-links, the switching device comprising:
a distribution identifier calculating unit which, when it receives a frame or packet, performs a logical operation with a predetermined operational expression while inputting a predetermined bit region in a header contained in the frame or packet, thereby calculating a k-bit distribution identifier;
a distribution table indicating a correspondence relation between the m sub-links and the k-bit distribution identifier;
a relay executing unit which relays the received frame or packet to the sub-link corresponding to the k-bit distribution identifier calculated in the distribution identifier calculating unit based on the distribution table; and
a distribution table generating unit which generates the distribution table,
the distribution table generating unit performs a first process of determining a first correspondence relation between the m sub-links and a j-bit (j<k) distribution identifier based on a predetermined rule and a second process of determining a second correspondence relation between the m sub-links and the k-bit distribution identifier by replacing the j-bit distribution identifier in the first correspondence relation with the k-bit distribution identifier partly containing the same j-bit value as the j-bit distribution identifier, and
the distribution table is generated by reflecting the second correspondence relation.

6. The switching device according to claim 5,
wherein the switching device has first and second distribution modes,
the distribution table generating unit executes the first and second processes in the second distribution mode, and executes a third process of determining a third correspondence relation between the m sub-links and the k-bit distribution identifier based on a predetermined rule in the first distribution mode instead of the first and second processes, and the distribution table is generated by reflecting the second correspondence relation in the second distribution mode and is generated by reflecting the third correspondence relation in the first distribution mode.

7. The switching device according to claim 6 further comprising:

a distribution mode setting unit, wherein the distribution mode setting unit executes a fifth process of transmitting a control frame indicating a bit number of its own distribution identifier to any one of the m fabric switches, a sixth process of receiving a control frame from one or plural other switching devices connected to any one of the m fabric switches through any one of the m fabric switches, and a seventh process of recognizing a minimum bit number among bit numbers of each distribution identifier indicated by the control frame from the one or plural other switching devices, and setting the first distribution mode when the minimum bit number is the k bits and setting the second distribution mode when the minimum bit number is less than the k bits.

8. The switching device according to claim 5, wherein the bit region input to the distribution identifier calculating unit is a region in which a destination address and a source address are stored, and the operational expression used in the distribution identifier calculating unit is an expression for performing a bit-by-bit exclusive OR operation to a plurality of z-bit strings obtained by dividing the bit region for each z bits ($z \geq k$).

9. The switching device according to claim 5, wherein the m sub-links are composed of one or plural links, the switching device sets a link aggregation group to the plural links constituting each of the m sub-links in addition to the m sub-links, the distribution table generating unit further executes a fourth process of assigning the k-bit distribution identifier corresponding to each sub-link to the one or plural links constituting each sub-link based on a predetermined rule for each of the m sub-links in the second correspondence relation, thereby determining a fourth correspondence relation between the one or plural links constituting each of the m sub-links and the k-bit distribution identifier, and the distribution table is generated by reflecting the fourth correspondence relation.

* * * * *